United States Patent
Roberts et al.

(10) Patent No.: US 11,347,650 B2
(45) Date of Patent: May 31, 2022

(54) WORD TYPE/BOUNDARY PROPAGATION WITH MEMORY PERFORMANCE APPLICATIONS

(71) Applicant: Advanced Micro Devices, Inc., Santa Clara, CA (US)

(72) Inventors: David A. Roberts, Boxborough, MA (US); Elliot H. Mednick, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/891,322

(22) Filed: Feb. 7, 2018

(65) Prior Publication Data

US 2019/0243772 A1 Aug. 8, 2019

(51) Int. Cl.
  *G06F 12/0895* (2016.01)
  *G06F 3/06* (2006.01)
  *G06F 12/06* (2006.01)

(52) U.S. Cl.
  CPC ........ *G06F 12/0895* (2013.01); *G06F 3/0619* (2013.01); *G06F 3/0649* (2013.01); *G06F 3/0685* (2013.01); *G06F 12/0646* (2013.01)

(58) Field of Classification Search
  None
  See application file for complete search history.

(56) References Cited

U.S. PATENT DOCUMENTS

| | | | | |
|---|---|---|---|---|
| 2010/0332716 A1* | 12/2010 | Sheaffer | ............... | G06F 12/0802 711/3 |
| 2012/0137075 A1* | 5/2012 | Vorbach | ............... | G06F 12/0842 711/122 |
| 2012/0144264 A1* | 6/2012 | Bains | ................... | G06F 11/1052 714/758 |
| 2014/0143780 A1* | 5/2014 | Strauss | .................... | G06F 17/10 718/100 |
| 2016/0253238 A1* | 9/2016 | Strauss | ............... | G06F 11/1072 714/721 |
| 2016/0254063 A1* | 9/2016 | Strauss | ............... | G06F 11/1048 714/721 |
| 2016/0345260 A1* | 11/2016 | Johnson | ............ | H04W 52/0209 |

OTHER PUBLICATIONS

M. Shoushtari, A. BanaiyanMofrad and N. Dutt, "Exploiting Partially-Forgetful Memories for Approximate Computing," in IEEE Embedded Systems Letters, vol. 7, No. 1, pp. 19-22, Mar. 2015. (Year: 2015).*

(Continued)

*Primary Examiner* — Edward J Dudek, Jr.
*Assistant Examiner* — Ralph A Verderamo, III
(74) *Attorney, Agent, or Firm* — Liang & Cheng, PC

(57) ABSTRACT

A method includes, for each data value in a set of one or more data values, determining a boundary between a high order portion of the data value and a low order portion of the data value, storing the low order portion at a first memory location utilizing a low data fidelity storage scheme, and storing the high order portion at a second memory location utilizing a high data fidelity storage scheme for recording data at a higher data fidelity than the low data fidelity storage scheme.

20 Claims, 7 Drawing Sheets

(56) References Cited

OTHER PUBLICATIONS

A. Ranjan, A. Raha, V. Raghunathan and A. Raghunathan, "Approximate memory compression for energy-efficiency," 2017 IEEE/ACM International Symposium on Low Power Electronics and Design (ISLPED), Taipei, 2017, pp. 1-6. (Year: 2017).*

A. Sampson, J. Nelson, K. Strauss and L. Ceze, "Approximate storage in solid-state memories," 2013 46th Annual IEEE/ACM International Symposium on Microarchitecture (MICRO), Davis, CA, 2013, pp. 25-36. (Year: 2013).*

* cited by examiner

WORD TYPE/BOUNDARY PROPAGATION WITH MEMORY PERFORMANCE APPLICATIONS

BACKGROUND

Modern computing systems typically include memory for storing information that is used when performing calculations or executing instructions. Main memory, or primary memory, often refers to semiconductor memory, which can include integrated circuits in which transistors are arranged to form memory cells. Individual bits of data can be stored in these memory cells. The computing system can also include a cache memory that is faster and smaller in capacity than the main memory. The cache memory speeds execution of a program by storing data values that are frequently accessed by a processor executing the program. The main memory may be implemented using dynamic random access memory (DRAM) modules, while cache can be implemented using static random access memory (SRAM).

Some memory technologies (e.g., flash or phase change memory) can be configured to record more than one bit in each memory cell. A multilevel cell can exist in four (i.e., two bits per cell) or more different voltage states, resulting in a higher bit density per cell compared to single level memory cells that have two voltage states. However, multilevel memory cells can also have a higher bit error rate than single level memory cells.

Different computing systems may store numbers in various internal formats within their respective memory cells. Typically, each numerical value can be stored as a number of bits (e.g., 16 or 32 bits) that are grouped and ordered. For example, a group of bits can be used to represent the exponent of a floating point numerical value while another group represents the mantissa. Bits within each group are ordered according to their values, so that the bit position having the highest value in the representation is at an opposite end from the bit position having the lowest value.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Many computations that can be executed in a computing system can tolerate some loss of accuracy in the least significant (i.e., lowest value) bits of numerical values used in the computation. Accordingly, one embodiment of a computing system includes a mechanism that propagates word boundary information for data values, allowing the memory system to distinguish the least significant (i.e., low order) bits from the most significant (i.e., high order) bits in a data value. In one embodiment, a tag includes metadata that describes the word format used in an associated data value or cache line containing data words. Such tags can be propagated along with the data through different memory levels and/or the processor, and can even be written to the main memory along with the associated data, either directly or via eviction from the cache.

By tracking and exposing word boundaries and data formats to caches and/or memory controllers in the computing system, these components can selectively apply optimizations when processing and storing the data. In one embodiment, the computing system uses this information about the data format to identify and selectively store the low order portion of a data value in the memory system using a low data fidelity storage scheme. For example, the low order portion can be stored in a multilevel memory cell to increase the bit density (i.e., areal or per-cell bit density) for storing the low order portion when an increase in the error rate for the low order portion can be tolerated. In one embodiment, the low order portion is compressed using a lossy compression scheme to reduce the amount of memory used. Thus, word boundary information can be used in the computing system to optimally balance data fidelity and storage space consumed by the low order portion of a data value separately from the high order portion. The more important high order data bits are stored using a high data fidelity storage scheme; for example, the high order bits can be stored in single level memory cells and/or compressed using a lossless compression scheme.

Figure 1:
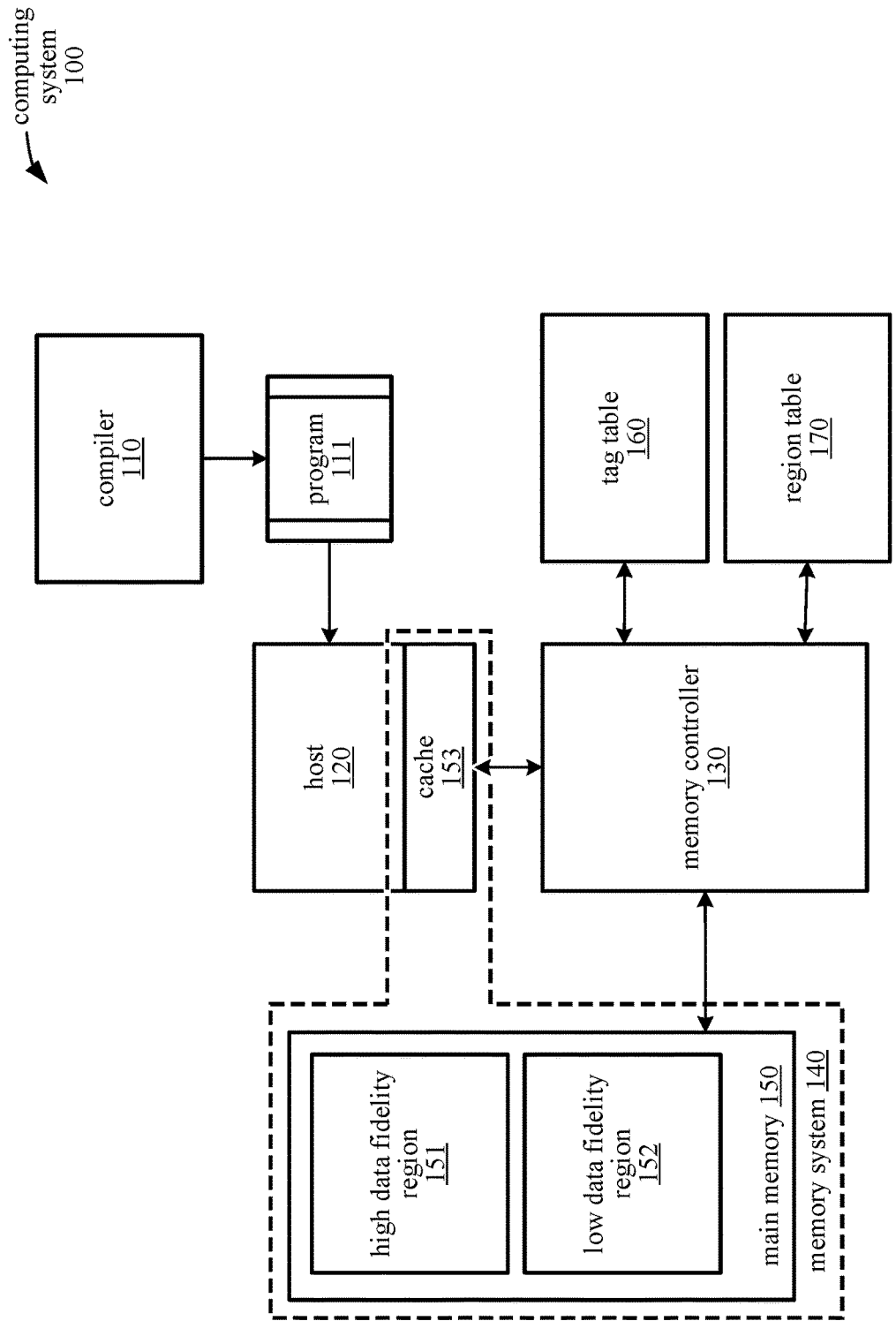
FIG. 1 illustrates an embodiment of a computing system.

FIG. 1 illustrates an embodiment of a computing system 100, in which word boundary and data format information is propagated to enable the storing of low order and high order portions of data values using different storage schemes. The computing system 100 includes a host device 120, which can be a central processing unit (CPU), graphics processing unit (GPU), field programmable gate array (FPGA), application specific integrated circuit (ASIC), or other logic circuit device having processing capabilities. The host device 120 executes instructions in the program 111. In one embodiment, the program 111 defines a set of computations that can tolerate some loss of accuracy in the data values it uses; that is, a limited amount of error in the data values used in the computations can still result in a useful output. For example, neural networks used for machine learning applications may generate final outputs that are largely unaffected by errors in less significant bits of intermediate values generated in the network.

During execution of the program 111 in the computing system 100, the computing system 100 generates, propagates, and utilizes word boundary information for a set of data values used in the program 111. In one embodiment, each data value represents a variable used in the program, and is used as an operand in one or more instructions in the program 111. Alternatively, a data value can represent a group of variables, or data in a specific memory range.

The compiler 110 generates the word boundary information for each of the data values used in the program 111, and this word boundary information is associated with a data type that is stored in a tag for each data value. The boundary information is recorded as a boundary indication value that identifies the boundary by, for example, identifying a bit in the high order portion of the data value that is adjacent to the low order portion, or alternatively, a bit in the low order portion that is adjacent to the high order portion. The boundary indication value can be stored in internal configuration memory in the memory controller 130, or can be stored in other memory accessible to the memory controller 130 such as the main memory 150. The memory controller 130 then determines the boundary for a data value based on the data type stored in a tag for the data value. In some embodiments, the tag also contains other metadata such as one or more offset values, a count value, a memory stride length, etc. that is used to identify the data values or regions of a data value to which the tag applies.

During compiling of the program 111, the compiler 110 generates the tags for each of the data values and adds the tags to instructions in the program 111. For example, the compiler 110 adds tags to the load and store instructions in the program that indicate the number (i.e., count), data type, and location of words within the data being accessed. In one embodiment, the compiler 110, instead of changing the instruction format, causes tags to be created in memory which describe the location and format of variables in the program 111. The compiler 110 adds instructions for initializing a tag table 160 containing the tags, which is initialized when the program 111 is run. The source code of program 111 could also include special directives to indicate specific formats for data allocated off the heap (e.g. by adding a new parameter to the malloc( ) function in the C programming language standard library). The compiler 110 also generates tags for the corresponding data according to any such directives present in the source code.

If not explicitly specified, the data type of each data value used in the program 111 can be otherwise determined by the compiler 110; for example, operations such as arithmetic instructions typically imply a particular word size and format for their operands or referenced memory. Accordingly, the compiler 110 generates boundary information for the data value based on the data type implied for the data value. The boundary information identifies a high order portion and a low order portion of the data value, according to the data type of the data value.

In the computing system 100, tags can be stored in the memory system 140, in the tag table 160, and/or in region table 170. A tag (including the offset value, data type, stride length, etc.) for each data value in a set of data values used by the program 111 is stored in one or more of these locations via the memory controller 130. In alternative embodiments, tags are stored by devices other than the memory controller 130. For example, the tables 160 and 170 when allocated by the compiler 110 could be written to internal SRAM memory scratchpads, without involving the memory controller 130.

In one embodiment, the tags are collocated with, or placed adjacent to, their corresponding data values in memory system 140. Collocation of the tag with its associated data value in the main memory 150 and/or the cache 153 allows the memory controller 130 to readily locate the tag information for a particular data value, given the location of the data value. In addition, a data value and its tag are likely to be stored in the same cache line in the cache 153 or memory row in the main memory 150 when written to one of these regions. Tags that are embedded in cache lines adjacent to their corresponding data values transparently propagate through the memory system 140 along with their data values. When data is written to the cache 153, the tags are encoded in load or store instructions to be stored in cache lines in the cache 153. In one embodiment, the memory controller 130 copies the data value contemporaneously with its associated tag to the same cache line in the cache 153. The tags are then communicated to the memory controller 130 when a write-back occurs.

In one embodiment, tags are stored in the tag table 160 generated by the compiler 110. A pointer to the tag table 160 is supplied to any devices (e.g., processor, smart memory devices, hardware accelerators, etc.) in the computing system 100 that will access the tag information.

When data values are written to the cache 153, their corresponding tags are stored in the associated tag table 160. The tag table 160 associates each tag (and information contained in the tag, such as the offset value, data type, etc.) with a memory address for its corresponding data value. Accordingly, tags stored in the tag table 160 are referenced by the memory controller 130 based on the address of read or write requests received by the memory controller 130. Thus, the memory controller 130, in response to receiving a read or write request for a data value, determines the boundary information (e.g., a boundary indication value indicating a word boundary in the data value), data type, or other information for the data value based on the memory address of the request.

The computing system 100 also includes a region table 170, which stores descriptors for defining one or more different memory regions, where each memory region stores data in a particular format. That is, all of the data values in one of the memory regions defined in the region table 170 share the same data type, word boundaries, or other characteristics. The descriptors in region table 170 can be defined by a user (e.g., via application programming interface (API) calls), the compiler 110, or a runtime system. The memory regions defined in the region table 170 can be contiguous or strided. The region table 170 associates each of its defined memory regions with a tag that specifies one or more offset values, data types, etc. for the data values to be stored in the memory region. In one embodiment, the region table 170 is stored in dedicated SRAM or DRAM.

In response to a memory request (e.g., a read or write request), the memory controller 130 queries the region table 170 to determine the type and/or format of the data being accessed. Tags stored in the region table 170 can be referenced by the memory controller 130 based on the address of the read or write request received by the memory controller 130. For example, upon receiving a memory request for a particular memory address, the memory controller 130 identifies one of the defined memory regions in the region table 170 in which the memory address is located, then identifies a tag associated with the memory region. The identified tag thus provides the memory controller 130 with the offset value, data type, and other data format information for the data value associated with the memory request.

The computing system 100 is capable of utilizing any combination including one or more of the above approaches for recording and propagating word boundary information and other metadata for data values: collocating tags in memory with their respective data values, storing tags in a tag table, and defining memory regions associated with the same data type and/or format in a region table. In one embodiment, the memory controller 130 utilizing more than one of the above approaches searches for a tag for a data value according to a search order. For example, the memory controller 130 may search for a collocated tag, query the tag table 160, and query the region table 170 in sequence until a tag for the data value of interest is found.

The memory controller 130 performs requested load and store operations for a data value according to the metadata in the tag associated with the data value. In one embodiment, the memory controller 130 uses the boundary information associated with the data type indicated in the tag to identify a word boundary between a high order portion and a low order portion of the data value, and stores these portions in the memory system 140 using different storage schemes. In particular, the memory controller 130 stores the low order portion at a first location in the memory system utilizing a low data fidelity storage scheme, and stores the high order portion at a second memory location in the memory system utilizing a high data fidelity storage scheme. The high data fidelity storage scheme records the data value at a higher data fidelity than the low data fidelity storage scheme. In other words, the high data fidelity storage scheme records the data more accurately than the low data fidelity storage scheme, and is less susceptible to bit errors or data loss.

Data values and their collocated tags are stored in the cache 153 using a high data fidelity storage scheme. Data values that are frequently accessed for performing computations of the program 111 are copied to the cache 153 by the memory controller 130 to minimize the memory access latency for these data values. Accordingly, data fidelity is preserved for data in the cache 153 so that these frequent computations do not cause the data values to accumulate error while they are stored in the cache 153. The data values are used many times within the cache 153 (or other on-chip caches or memories) before being stored again to the main memory 150 or other external memories. As a result, loss of bit accuracy due to using a lower fidelity storage scheme in the main memory 150 has reduced impact, because only the less significant portions of infrequently used data values that are evicted from the cache are affected.

In the main memory 150, the high order and low order portions of the data value are stored according to high data fidelity and a low data fidelity storage schemes, respectively. In one embodiment, the high data fidelity storage scheme is a scheme in which the high order portion of the data value is compressed using a lossless compression scheme before it is recorded in the main memory 150. According to the low data fidelity storage scheme, the low order portion of the data value is compressed using a lossy compression scheme before it is recorded in the main memory 150. Compared to the high data fidelity storage scheme, the low data fidelity storage scheme results in a higher rate of bit errors (and therefore, lower data fidelity) due to the lossy compression scheme. However, a lossy compression scheme can be selected that optimally reduces the memory storage consumed while producing a bit error rate that can be tolerated by the application.

Data in the cache 153 is recorded according to a high data fidelity storage scheme. Since the cache 153 provides low latency access to its data, the data is stored in uncompressed form. Accordingly, the memory controller 130 decompresses the high and low order portions of a data value when copying the data value to the cache 153. When performing a write-back from the cache to the main memory 150, the memory controller 130 compresses the high order and low order portions of the data value using the lossless and lossy compression schemes, respectively, prior to writing these portions to the main memory 150. Accordingly, some tolerable amount of error is introduced in only the less significant low order portion of the data value.

In one embodiment, the main memory 150 includes a high data fidelity region 151 and a low data fidelity region 152. Data stored in the high data fidelity region 151 is recorded according to the high data fidelity storage scheme, while data stored in the low data fidelity region 152 is recorded according to the low data fidelity storage scheme. According to this arrangement, the low order and high order portions of a single data value can be stored non-contiguously in separate regions of the main memory 150.

The high data fidelity and low data fidelity storage schemes can also refer to storage schemes in which different memory technologies are used, which affect the resulting data fidelity and bit density. In one embodiment, the main memory 150 includes non-volatile multilevel memory modules that are configured to store multiple bits per memory cell. Relative to a single level memory cell, a multi-level non-volatile memory cell has increased storage density at the expense of decreased reliability and data fidelity.

Thus, a data value can be divided into different portions (e.g., high order and low order portions) that are stored in different types of multilevel memory cells (i.e., having different per-cell bit densities). The memory controller 130 uses the metadata in the tag for the data value to selectively use different bit densities for storing different portions of each data value.

In one embodiment, the high and low data fidelity regions 151 and 152 represent different address ranges, banks, channels, or devices, where the regions 151 and 152 are configured to operate in different multilevel cell (MLC) modes. Different MLC modes can also be used within a single row buffer in the main memory 150. In this case, the host device 120 sends additional signals to the memory controller 130 indicating the word boundaries for the data values to be stored and the MLC levels at which each bit should be stored within the indicated word boundaries.

In addition, non-volatile memory modules in the memory system 140 can support direct analog storage (i.e., storage in analog form) of less significant portions of data values. Memory technologies such as resistive random-access memory (RRAM) or Flash have a hysteresis curve amenable to programming via a voltage level, in contrast with timed pulses that are used for programming phase change memory (PCM). Accordingly, these memory types can be configured to operate in a non-digital way, which avoids the iterative programming approach where voltage pulses are applied to successively change the voltage or resistance to the correct digital level, using a comparator to check whether the target has been reached. This analog programming approach reduces latency at the cost of reduced accuracy, which is acceptable for some applications.

An analog mode selection signal transmitted to memory modules in the memory 150 enables the analog programming mode, in which a programming voltage is driven directly into each bitline. Reading the data could proceed either using digital sensing, or by switching pins of the memory module to an analog sensing mode to allow a reading device (e.g. host device 120) to sense the voltage on the bitlines itself.

Figure 2:
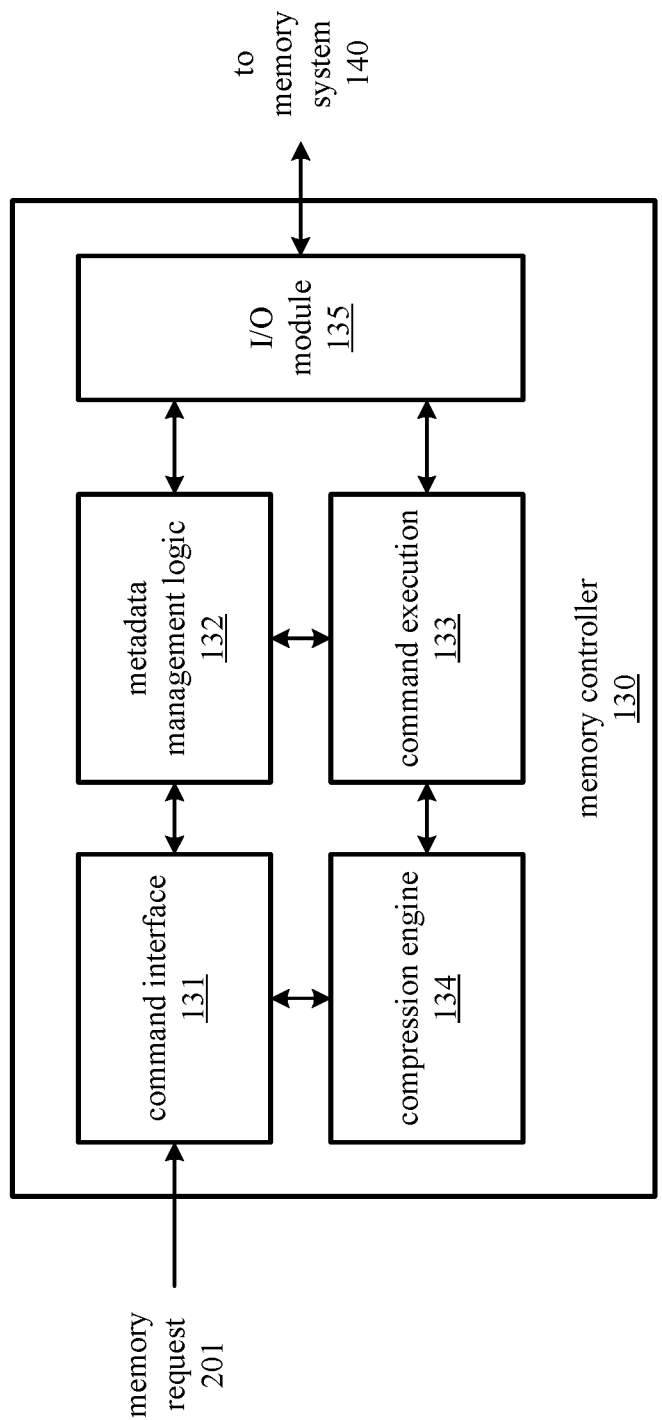
FIG. 2 illustrates a memory controller, according to an embodiment.

FIG. 2 illustrates a block diagram of the memory controller 130, according to an embodiment. The memory controller 130 includes several circuit modules: a command interface 131, metadata management logic 132, a command execution module 133, a compression engine 134, and an input/output module 135.

The command interface 131 includes communication circuitry for receiving memory requests from devices in the computing system 100, such as the host device 120. A memory request 201 received at the command interface 131 can be a read request that specifies a memory address in the memory system 140 from which data is to be read, or a write request that specifies one or more data values along with a memory address at which the one or more data values are to be written.

The metadata management logic 132 reads tags to determine appropriate word boundaries for data values in connection with servicing memory request 201 and other memory requests received at the command interface 131. Based on the retrieved tag information (e.g., the data type), the metadata management logic 132 also determines which bits in a data value correspond to the high order and low order portions so that these portions can be recorded in the memory system 140 using the appropriate storage schemes.

In one embodiment, directives issued during execution of the program 111 identify the appropriate tags to be used when determining word boundaries for data values when read or write requests for the data values are received (e.g., by providing the memory addresses of tags or region tables that the memory controller 130 should use). In one embodiment, the program 111 specifies a tag describing a data value in connection with the allocation of the data value from the heap. A specified tag includes metadata describing the data value of the request, including a data type that references boundary information for identifying a word boundary between a high order portion and a low order portion of the data value.

The metadata management logic 132 retrieves the tags in response to memory requests received at the command interface 131. A memory request 201 indicates a read address from which a data value is to be read, or a write address at which a data value supplied by the request is to be written. Based on the read address or the write address, the metadata management logic retrieves a tag associated with the data value by locating the tag adjacent to the data value in memory (when the tag is collocated with the data value), by referencing the tag in the tag table 160 using the read or write address, or by identifying in the region table 170 a tag that is associated with a memory region containing the address. The metadata management logic 132 then extracts relevant metadata from the tag, including the data type, which is used to identify the high order portion and the low order portion of the data value. In one embodiment, the metadata management logic 132 includes memory for storing a boundary indication value for each data type, which is used to determine the word boundaries for the data type. In some embodiments, the data type is associated with more than two portions; that is, the data value is divided into an arbitrary number of portions (e.g., high, one or more middle, and low order portions) instead of only a high order portion and a low order portion.

When the memory request 201 is a write request, the command execution module 133 executes the write request 201 by storing the low order portion of the data value at a first memory location in the memory system utilizing a low data fidelity storage scheme, and stores the high order portion at a second memory location in the memory system utilizing a high data fidelity storage scheme. This may entail, for example, storing the low order portion of the data value in a multi-level memory cell, and storing the high order portion of the data value in a single level memory cell. Alternatively, the low order portion can be compressed using a lossy compression scheme before it is recorded in memory, while the high order portion is compressed using a lossless compression scheme or is recorded in memory in uncompressed form.

The input/output (I/O) module 135 generates the actual physical signals for reading from and writing to the memory modules in memory system 140. Accordingly, the command execution module 133 executes the memory request 201 by directing the input/output (I/O) module 135 to generate the appropriate hardware signals.

The memory controller 130 includes a compression engine 134, which includes circuitry for compressing and decompressing data according to one or more compression algorithms, providing compressed data values to the command execution module 133, and returning decompressed data to the command interface 131. The compression engine 134 receives data values from the command interface that are to be written to the memory system 140 and compresses these data values so that they can be stored in compressed form. For a data value received via a write memory request 201, the compression engine 134 compresses the low order portion of the data value using a lossy compression scheme and compresses the high order portion of the data value using a lossless compression scheme. The lossy compression scheme has a higher compression ratio than the lossless compression scheme. Alternatively, the compression engine 134 does not compress the high order portion of the data value, so that the high order portion is stored in an uncompressed state.

When data values are read from the memory system 140, the compression engine 134 accordingly decompresses the low order and high order portions of the data values. Thus, the data values are stored in the cache memory in uncompressed form and used in computations for executing the program 111.

In one embodiment, the compression engine 134 achieves the greatest reduction of bits by truncating the low order portion of a data value so that only the high order portion of the data value is stored in the main memory 150 (e.g., during a write-back from the cache 153). When a previously truncated data value is read back from the main memory 150, the lost bits in the low order portion are restored by initializing them to random values, or to zero or another predetermined pattern of bits.

The compression engine 134 can also receive additional parameters in connection with a memory read or write request 201 that specify the word size, starting bit or byte position, and a number of contiguous bits or bytes that should not be compressed and that should instead be stored in the memory 150 in uncompressed form. This mechanism allows dynamic control over the number and location of bits that are compressed using the lossy compression scheme.

The compression engine 134 is illustrated in FIG. 2 as being included in the memory controller 130; however, the compression engine 134 can alternatively be external to the memory controller 130, or may be implemented using a separate hardware accelerator. In one embodiment, the functions of the compression engine 134 are implemented using a software thread, or a combination of hardware and software.

The memory controller 130 or compression engine 134 can also configure regions of memory (e.g. based on page table attributes) to pack data in those regions appropriately for different data types (e.g., integer, floating point, etc.) to be stored in the regions. For example, a region can be defined in the memory 150 in which all of the data values stored in the region have the same data type and therefore have their bits similarly divided between high and low order portions. Thus, each of the data values in the region has their respective high and low order portions compressed according to the same schemes. The memory controller 130 or compression engine 134 can also disable specific types of compression (e.g., lossy compression) or disable compression entirely for specific memory pages or regions where data integrity is critical. The regions are defined in the region table 170, which associates each memory region (e.g., defined by memory address range) with one or more offset values, data type indicators, and/or other metadata describing the data to be stored in the region.

Figure 3A:
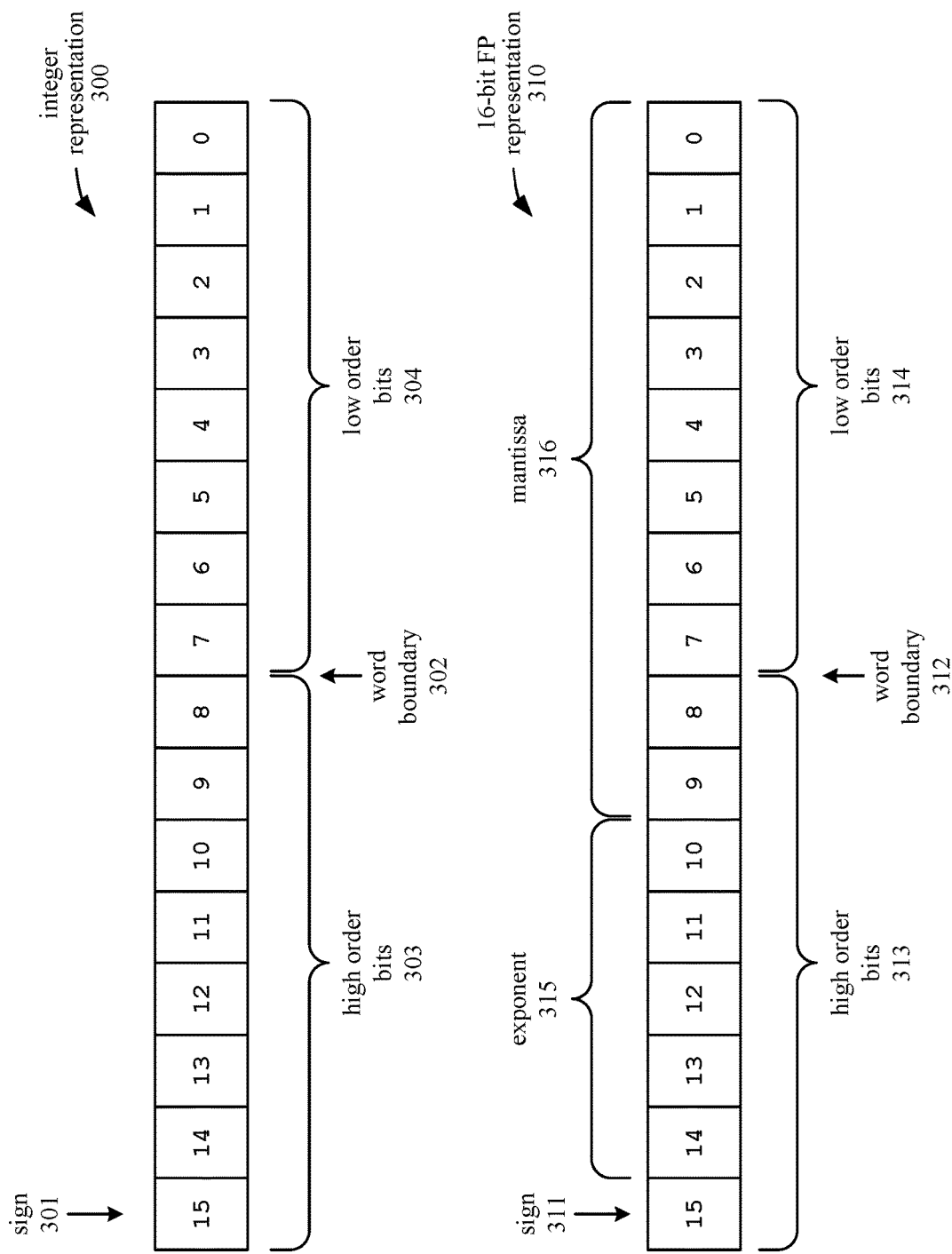
FIGS. 3A-3B illustrate number representations each divided into multiple portions, according to an embodiment.

FIG. 3A illustrates a 16-bit signed integer numerical value representation 300 and a 16-bit signed floating point (FP) numerical value representation 310. The integer representation 300 includes 16 bits in numbered positions 0 to 15, with bits 0-14 representing the absolute value of the integer and a sign bit 301 at bit position 15 indicating whether the integer is positive or negative. In the numerical value representations 300 and 310, higher numbered bit positions are more significant than lower numbered bit positions. A word boundary 302 indicates a boundary in the representation 300 between the high order bits 303, including bits 8-15, and the low order bits 304, including bits 0-7. A device or process identifies the high order 303 and low order 304 portions of an integer type data value based on the boundary 302, which is indicated by a boundary indication value that corresponds to a data type stored in a tag associated with the data value.

The 16-bit signed floating point representation 310 includes 16 bits in numbered positions 0-15, with bits 0-9 representing the mantissa 316 and bits 10-14 representing the exponent 315 of the floating point number. The sign bit 311 is located at position 15 in the representation 310 and indicates whether the floating point number is positive or negative. Word boundary 312 indicates a boundary in the representation 310 between the high order bits 313, including bits 8-15, and the low order bits 314, including bits 0-7. A device or process can identify the high order 313 and low order 314 portions of a floating point type data value based on the boundary 312, which is indicated by a boundary indication value that corresponds to a data type stored in a tag associated with the data value.

The compression engine 134 uses the boundary information indicating the word boundaries (e.g., 302 and 312) to more heavily compress the lower order portions (e.g., 304 and 314) of the data values. For 16 bit integers represented according to the integer representation 300, the low order bits, representing the least significant bits of the integer, are compressed at a higher compression ratio than the high order bits 303. For a 16 bit floating point representation 310, the low order bits, representing the least significant bits of the mantissa 316, are compressed at the higher compression ratio. In one embodiment, the higher compression ratio is achieved by using a lossy compression scheme. Alternatively, the low order bits can be truncated or stored in memory having a higher number of bits per cell, such as multilevel memory cells, as previously described. In general, these approaches for storing the high order and low order portions of data values aim to preserve accuracy for the high order bits (e.g., sign bits 301 and 311, most significant bits of the integer 300, and exponent 315 and the most significant bits of the mantissa 316).

Figure 3B:
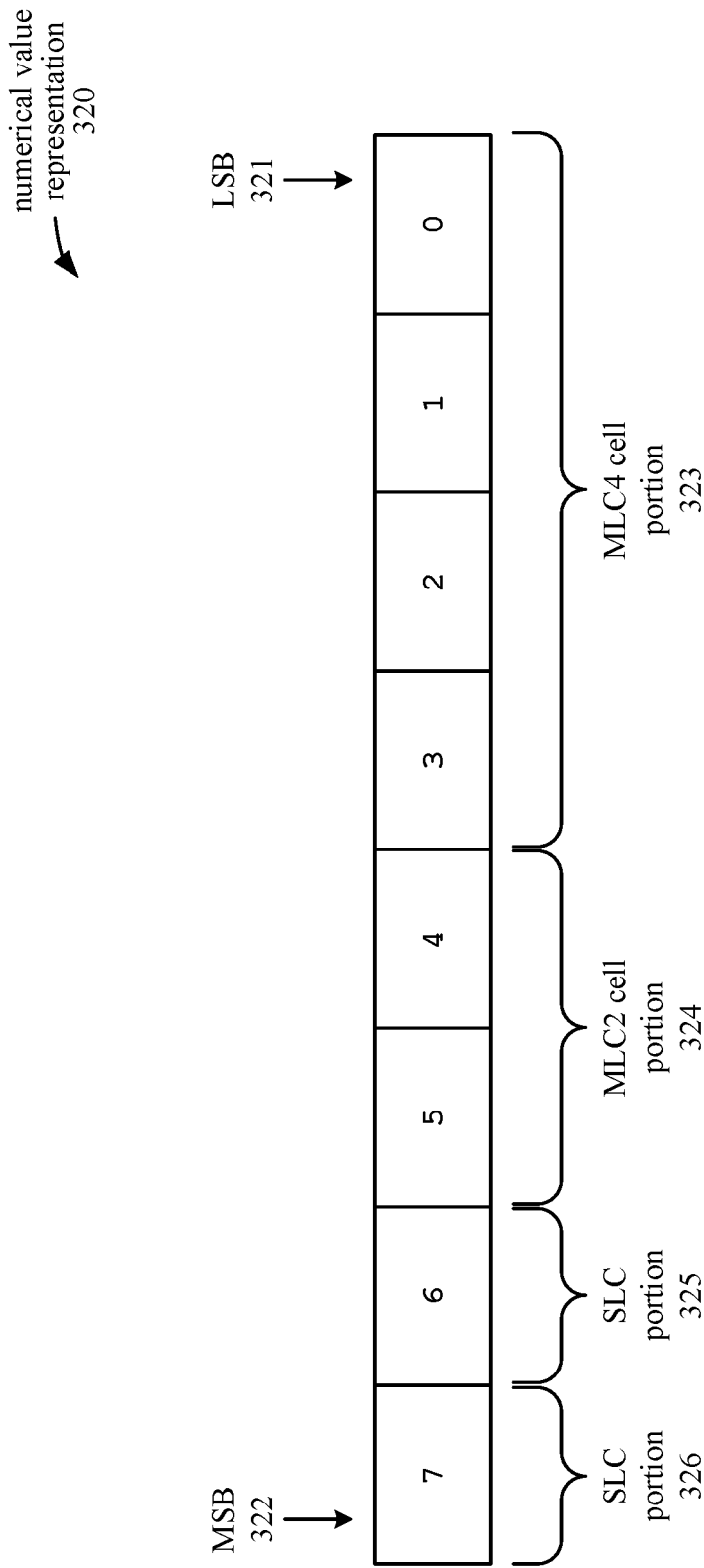

FIG. 3B illustrates an 8-bit numerical value representation 320 that is divided into multiple portions, according to an embodiment. The numerical value representation 320 includes 8 bits in numbered bit positions 0-7. Bit 0 is the least significant bit (LSB) 321 and bit 7 is the most significant bit (MSB) of the representation 320. The numerical value representations 300 and 310 in FIG. 3A are illustrated as being divided into a high order portion and a low order portion; by contrast, the numerical value representation 320 is illustrated in FIG. 3B as being divided into four portions 323-326 that can be stored utilizing different storage schemes. These four portions 323, 324, 325, and 326 correspond respectively to bits 0-3, bits 4-5, bit 6, and bit 7. Boundaries between adjacent portions are indicated by boundary indication values associated with a data type of the data value. A data type indicated in the tag may be associated with one or multiple boundaries, so that a single data value can be divided into two or more portions.

In one embodiment, the memory system 140 includes multilevel memory cells (e.g., Flash or PCM) for storing the different portions 323-326 at different bit densities. The multilevel memory cells can be configured to store one or more bits (e.g., 1, 2, or 4) per cell. In general, each multi-level cell can store N bits of data in $2^N$ discrete voltage or resistance levels in a single cell. Greater values of N (i.e., more levels per cell) result in higher bit densities and increased bit error rates. Single-level cells (SLC) each store a single bit using two available voltage states, two-bit width multilevel (MLC2) cells each store two bits using four available voltage states, and four-bit width multilevel (MLC4) cells each store four bits using 16 available voltage states. Different multilevel cell types are not required to be located in different memory banks or even different rows. The programming of multilevel bit cells at different levels is determined by access logic for the cells; accordingly, a special row buffer and sense amplifier circuit could be implemented that programs adjacent cells differently from each other.

For data values stored in memory according to the numerical value representation 320, different portions of the data values are stored in different multilevel memory cell types. For each data value, the least significant bits 0-3 are stored in MLC4 memory, bits 4-5 are stored in MLC2 memory, and the most significant bits 6 and 7 are stored in SLC memory. Accordingly, more significant bits are stored according to a more reliable high data fidelity storage scheme, while the less significant bits are stored according to a lower data fidelity storage scheme that has a higher bit density, thus increasing the overall bit density for storing the data value while minimizing the impact of bit errors. In one embodiment, the portions 323-326 are all stored in adjacent cells in the same memory device, or in separate sub-arrays or channels. Alternatively, the portions 323-326 of a single data value are stored in different regions of the same memory device, or in separate memory devices.

In one embodiment, the different portions 323-326 are compressed according to different compression schemes instead of or in addition to being stored in different types of multilevel memory cells. For example, the lowest order portion 323 is compressed using a lossy compression scheme having the highest compression ratio and highest degree of lossiness (i.e., lower data fidelity), while portion 324 is compressed using a lossless (i.e., higher data fidelity) compression scheme having a lower compression ratio. The most significant bits in portions 325-326 remain uncompressed.

Compared to numerical value representation 320, other numerical value representations can have a greater or fewer number of bits and may be divided into a greater or fewer number of portions, where each portion has fewer or more bits than the portions 323-326. Alternative embodiments may also use different multilevel cell types or compression schemes to store the different portions. In one embodiment, portions that include only a small number of bits are compressed in combination with corresponding portions from other data values.

Figure 4:
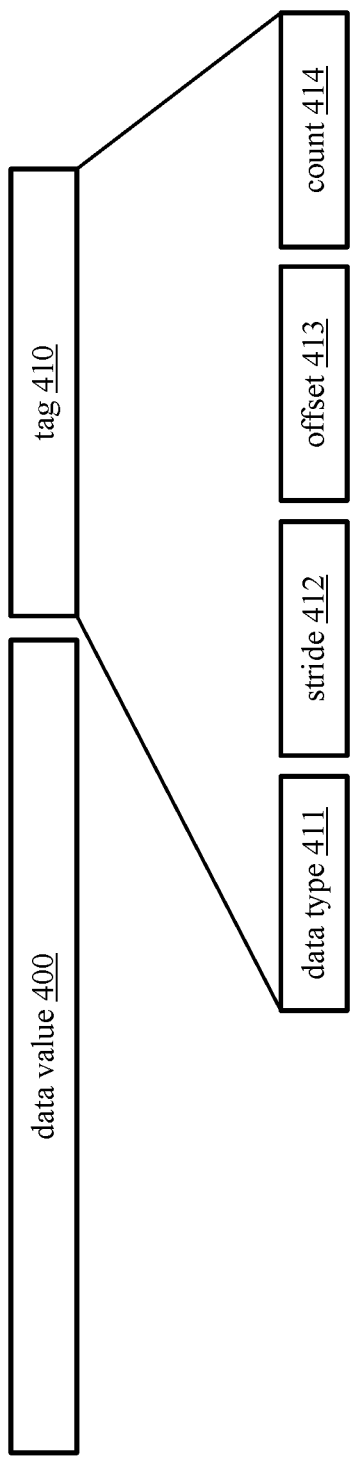
FIG. 4 illustrates a data value and its associated tag, according to an embodiment.

FIG. 4 illustrates a format for a tag 410 that includes metadata describing a data value 400, according to an embodiment. The data value 400 can represent an individual word or multiple words. As illustrated in FIG. 4, tag 410 is collocated with its associated data value 400; however, the tag 410 can also be associated with the data value 400 via a tag table 160 or a region table 170.

The tag 410 includes the following fields: a data type field 411, a stride length field 412, an offset field 413, and a count field 414. The data type field 411 indicates the data type of the data value 400 (e.g., 8-bit integer, 16-bit integer, 16-bit floating point, 32-bit floating point, etc.), which further implies the number of bits there are in each word. The offset field 413 stores an offset value for the data value, which indicates the beginning of the first word in the data value region. The count field 414 indicates a number of words, starting from the offset, that are described by the tag 410. The stride length field 412 indicates a stride length (having a value between 0 and N−1, where N is the maximum number of words in a line) for storing the data value 400 in memory. The stride length indicates the number of words in between successive words of the given type within the associated region. For example, a stride length of 0 indicates that the words described by the tag are adjacent to each other (i.e., contiguous), with the number of words indicated by the count field 414. For a stride length of 1, every other word is skipped. More than one tag can be used to describe words in the same region or in overlapping regions. For example, a first tag that indicates an offset of 0 and a stride length of 1 can be associated with the same region as a second tag indicating an offset of 1 and a stride length of 1. Words described by the first and second tags are interleaved with each other within the same region. Specific tags may include fewer or more fields; for example, a tag for an individual word may only include a data type field 411 in cases where the size is already implied. In some embodiments, the count 414 and offset 413 values are associated with and can be referenced based on the data type 411, and can thus be excluded from the tag 410 to reduce the tag size.

The above tag storage techniques can also be extended for use with data structures (e.g., structs) where multiple variables and/or data types are packed together. In one embodiment, a representation of the data structure is stored in the tag table 160 that can be referenced by the memory controller 130 so that tags can be associated with specific portions of the data structure. Alternatively, elements of the data structure can be interleaved with their associated tags wherever they are stored in memory.

Figure 5A:
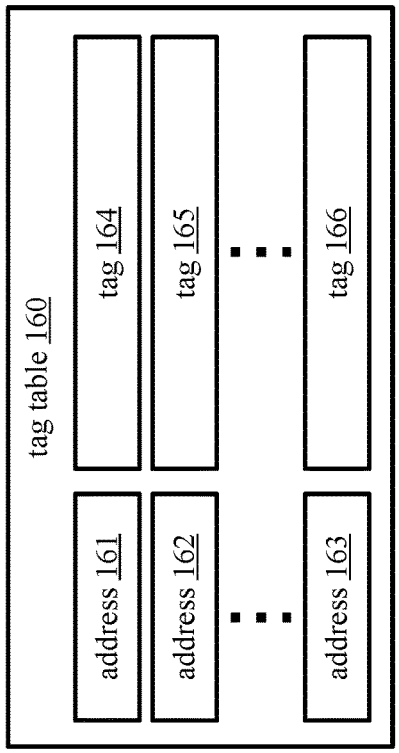
FIG. 5A illustrates a tag table, according to an embodiment.

FIG. 5A illustrates a tag table 160, according to an embodiment. In one embodiment, the tag table 160 is stored in the main memory 150 of computing system 100. Alternatively, the tag table 160 can be stored in the memory controller 130, in another component in the computing system 100, or in another memory device accessible by the memory controller 130. The tag table 160 stores address values 161-163 and tags 164-166. In the tag table 160, each of the tags 164-166 is associated with a corresponding address 161-163. Each address is the address for a data value described by the corresponding tag. Accordingly, the memory controller 130, upon receiving a memory request 201 that specifies an address for a data value, can look up the tag for the data value using the address in the memory request 201.

Figure 5B:
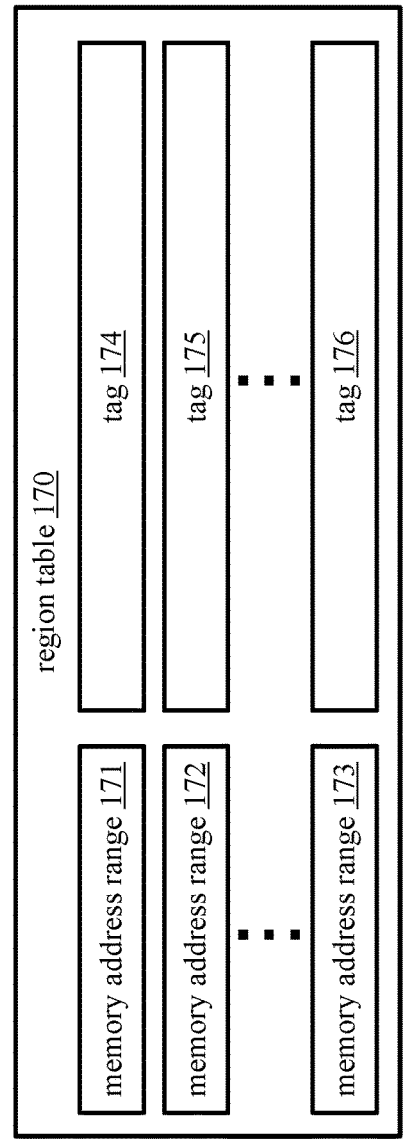
FIG. 5B illustrates a region table, according to an embodiment.

FIG. 5B illustrates a region table 170, according to an embodiment. In one embodiment, the region table 170 is stored in the main memory 150 of the computing system 100. Alternatively, the region table 170 can be stored in the memory controller 130, in another component in the computing system 100, or in another memory device accessible by the memory controller 130. The region table 170 stores memory address range descriptors 171-173, in which memory address ranges may be represented as, for example, a starting memory address and an ending memory address for the range, or a base address and offset or count value. Each memory address range 171-173 is associated in the region table 170 with a corresponding tag 174-176. Each memory address range 171-173 defines a memory region in the main memory 150. The corresponding tag for the memory region contains metadata (e.g., data type, offset value, etc.) that identifies and/or describes the data values stored in the defined region. Thus, the same types of data values are stored together in the same memory region.

Figure 6:
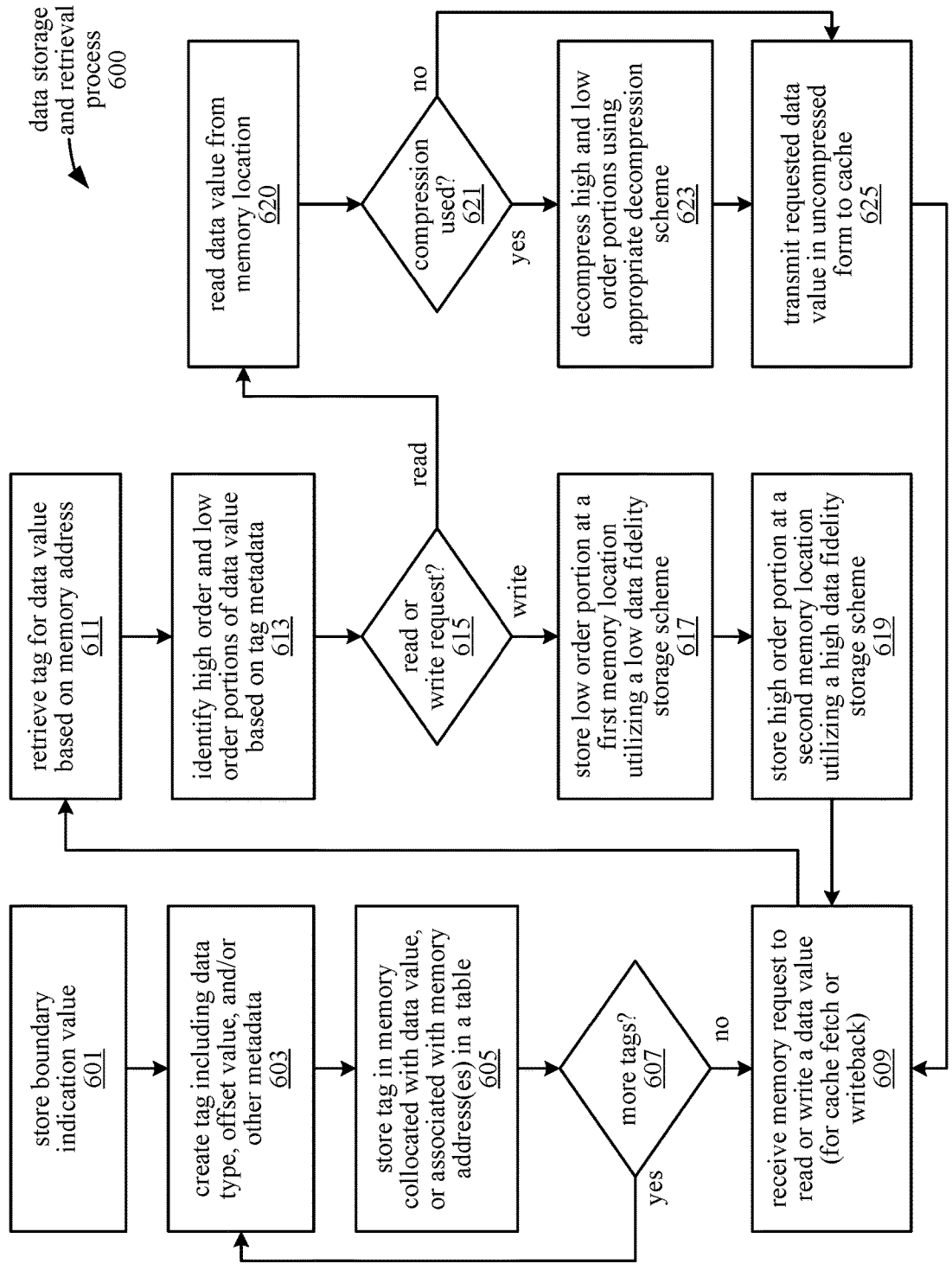
FIG. 6 is a flow diagram illustrating a process for storing and retrieving data values, according to an embodiment.

FIG. 6 illustrates a process 600 for storing and retrieving data values in a computing system 100, according to an embodiment. The process 600 is performed by the memory controller 130 and other components of the computing system 100. The process 600 is performed during execution of a program 111 in the computing system 100 for storing data values in the memory system 140 (e.g., for a write-back from cache 153) and for retrieving (e.g., for fetching to the cache 153) the data values from the memory system 140.

The process 600 begins at block 601. At block 601, one or more boundary indication values are stored in memory that is accessible to the memory controller 130. Each of the boundary indication values is associated with a data type. In one embodiment, the boundary indication values and their corresponding data types are stored in an internal memory of the memory controller 130. Alternatively, the boundary indication values can be stored in other memory that can be accessed by the memory controller 130, such as the main memory 150.

At block 603, a tag describing an associated data value is created by the compiler 110 or program 111. The data value represents a variable in the program 111 or an operand used in instructions of the program 111. The created tag includes metadata describing the associated data value, such as the data type 411, offset value 413, stride length 412, count value 414, and/or other metadata. In one embodiment, the creation of tags is initiated via one or more API calls.

At block 605, the memory controller 130 stores the created tag in memory. The tag can be stored in a memory location adjacent to its associated data value and thus collocated with its data value in memory. If portions of the data value are stored in noncontiguous physical memory locations (e.g., high and low order portions are stored in different memory regions), the tag can be stored adjacent to one or more of the portions, or can be stored at a logical memory address adjacent to a logical memory address of the data value. The tag can also be stored in an entry of the tag table 160 associated with a memory address of the data value. The tag can also be stored in an entry of the region table 170 associated with a memory region, as defined by a memory address range.

At block 607, if all the tags have not been created, the process 600 continues back to block 601. Accordingly, blocks 603-607 are repeated to create multiple tags for describing multiple data values in the program 111. In one embodiment, the program 111 may include a subroutine that allocates multiple data values together, along with their associated tags. In one embodiment, the process 600 performs blocks 601-607 whenever tag creation is directed for one or more data values during execution of the program 111. At block 607, if all tags have been created, the process 600 continues at block 609.

At block 609, the memory controller 130 receives a memory request 201 at its command interface 131. The memory request can be a read request that specifies a memory address from which a data value is to be read, or a write request specifying a data value and an address at which the data value is to be written. In one embodiment, the read request can be issued for fetching the data value from the main memory 150 to the cache 153, and the write request can be issued for performing a write-back of the data value from the cache 153 to the main memory 150.

Based on the memory address for the data value that is provided in the memory request 201, the metadata management logic 132 in the memory controller 130 retrieves the tag associated with the data value, as provided at block 611. If the tag is collocated with the data value, then the metadata management logic 132 reads the tag from the adjacent memory location at which the tag is stored. If the tag is stored in the tag table 160, the metadata management logic 132 locates the tag by referencing the memory address of the data value in the tag table 160. Similarly, if the tag is stored in the region table 170, the metadata management logic 132 identifies the appropriate tag by identifying the memory region defined in the table 170 in which the memory address is located, then reads the tag associated with the identified memory region. Upon locating the tag for the data value, the data type, offset value, and other metadata contained in the tag are available to the metadata management logic 132.

In one embodiment, the program 111 issues a directive to provide the memory address of a tag or region table that the memory controller 130 should use for determining word boundaries for data values when read or write requests for the data values are received; in such cases, the memory controller 130 reads the tag thus identified by the directive. The memory controller 130 can also be informed if tags are interleaved with data, so the memory controller 130 reads the tag before accessing the data. In an alternative mode of operation, the word boundary information is provided in tags or in additional signals along with incoming read or write instructions.

At block 613, the metadata management logic 132 in the memory controller 130 identifies the high order portion and the low order portion of the data value based on the metadata in the identified tag. The data type is used to reference one of the stored boundary indication values, which indicates a boundary between the high order portion and the low order portion. For a data value stored according to an integer number representation, the low order portion corresponds to the least significant bits in the integer number representation. For a data value stored according to a floating point number representation, the low order portion corresponds to a mantissa of the floating point number representation. The data type may be associated with multiple boundary indication values for delineating multiple portions of the data value that can be stored according to different storage schemes.

At block 615, if the memory request 201 is a write request, the process 600 continues at block 617. At block 617, the command execution module 133 and I/O module 135 of the memory controller 130 store the low order portion of the data value at a first memory location utilizing a low data fidelity storage scheme. For example, the low order portion may be stored in a MLC4 memory cell (which has a higher bit error rate than other types of memory), and/or compressed by compression engine 134 using a lossy compression scheme with a high compression factor prior to being stored.

At block 619, the command execution module 133 and I/O module 135 of the memory controller 130 store the high order portion of the data value at a second memory location utilizing a high data fidelity storage scheme. The second memory location at which the high order portion is stored need not be contiguous with the first memory location at which the low order portion is stored. The high data fidelity storage scheme records data at a higher data fidelity (i.e., with fewer bit errors) than the low data fidelity storage scheme. For example, the memory controller 130 stores the high order portion of the data value in a memory cell (e.g., SLC or MLC2 memory cell) having fewer levels than the MLC4 memory cells in which the low order portion is stored. The low data fidelity storage scheme (e.g., MLC4) thus records data at a higher bit density (i.e., per-cell or areal density) than the high data fidelity storage scheme.

The high order portion of the data value may also be compressed by compression engine 134 using a lossless compression scheme. Alternatively, the high order portion may be stored in uncompressed form. With either of these options, the high order portion is stored at a higher data fidelity than the low order portion compressed using the lossy compression scheme.

At block 615, if the memory request 201 is a read request, the process 600 continues at block 620. At block 620, the command execution module 133 and the I/O module 135 read the requested data value using the memory address provided with the memory request 201. From block 620, the process 600 continues at block 621. At block 621, if any portions of the data value have been stored in compressed form, the process 600 continues at block 623. At block 623, the compression engine 134 of the memory controller 130 decompresses the high order and the low order portions of the data value using the appropriate lossy or lossless compression schemes. From block 623, the process 600 continues at block 625.

At block 625, the memory controller 130 transmits the requested data value to the cache 153 or other requesting device in the computing system 100. In one embodiment, the tag is also copied to the cache 153 contemporaneously with the data value, and is stored in the same cache line with the data value. The tag is therefore collocated with the data value in the cache 153 and can be readily propagated to the host device 120 or other devices in the system 100. At block 621, if the data value is stored in uncompressed form, the process 600 continues to block 625 directly from block 621 without decompressing the data value as provided at block 623.

From block 625, the process 600 continues back to block 609 to receive and process the next memory request. The blocks in process 600 thus repeat in order to store and retrieve multiple data values, where different portions (e.g., higher order and lower order portions) of the stored data values are stored using storage schemes that effect different bit densities, compression ratios, bit error rates, etc.

By the operation of process 600, the computing system 100 allows word boundary information to be propagated between the devices in the computing system 100, such as the host 120, cache 153, and main memory 150. Accordingly, these components are able to identify less significant portions of a data value and selectively apply optimizations to different portions of the data value to balance data fidelity and bit density when processing and storing the data value.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:
for each of a plurality of data types, recording an association between the data type and one of a plurality of boundary indication values;
for each data value in a set of one or more data values,
in response to a memory request for the data value,
accessing a tag indicating a data type of the data value, and
determining a boundary indication value of the plurality of boundary indication values that indicates a boundary between a high order portion of the data value and a low order portion of the data value, wherein the boundary indication value for the data value is determined by accessing memory storing an association between the data type and the boundary indication value;
copying the tag to a cache line contemporaneously with copying the data value to the same cache line;
storing the low order portion at a first memory location utilizing a low data fidelity storage scheme; and
storing the high order portion at a second memory location utilizing a high data fidelity storage scheme for recording data at a higher data fidelity than the low data fidelity storage scheme.

2. The method of claim 1, wherein for each data value in the set of data values, the boundary indication value identifies a bit in the data value adjacent to a boundary between the high order portion and the low order portion.

3. The method of claim 2, wherein the method further comprises, for each data value in the set of data values:
storing the tag; and
in response to receiving a memory address for the data value, identifying the tag associated with the data value.

4. The method of claim 1, wherein:
the tag is stored adjacent to at least one of the high order portion of the data value and the low order portion of the data value.

5. The method of claim 1, further comprising, for each data value in the set of data values, reading the tag for the data value in response to a directive in a program being executed, wherein the data value represents an operand of an instruction in the program.

6. The method of claim 1, further comprising:
in a region table, associating the boundary indication value with a memory region; and
for each data value in the set of data values, determining the boundary indication value for the data value by referencing in the region table the memory region in which the data value is stored.

7. The method of claim 1, wherein a first data value of the set of data values is stored according to an integer number representation, wherein the low order portion of the first data value corresponds to the least significant bits in the integer number representation, and wherein a second data value of the set of data values is stored according to a floating point number representation, and wherein the low order portion of the second data value corresponds to a mantissa of the floating point number representation.

8. The method of claim 1, wherein for a first data value in the set of data values, the low order portion of the first data value is stored in a first memory cell and the high order portion of the first data value is stored in a second memory cell, wherein the first memory cell is a multi-level memory cell having more levels per cell than the second memory cell.

9. The method of claim 1, wherein:
storing the low order portion at the first memory location utilizing the low data fidelity storage scheme comprises compressing the low order portion using a lossy compression scheme,
storing the high order portion at the second memory location utilizing the high data fidelity storage scheme comprises compressing the high order portion using a lossless compression scheme, and
the method further comprises decompressing the low order portion and the high order portion when transferring the data value to a cache memory.

10. A memory controller, comprising:
a command interface configured to receive a set of one or more data values for storing in a memory system;
metadata management logic coupled with the command interface and configured to:
for each of a plurality of data types, record an association between the data type and one of a plurality of boundary indication values, and
for each data value in the set of one or more data values, in response to a memory request for the data value, access a tag indicating a data type of the data value, and
determining a boundary indication value of the plurality of boundary indication values that indicates a boundary between a high order portion of the data value and a low order portion of the data value, wherein the memory controller is configured to copy a tag associated with the data value to a cache line contemporaneously with copying the data value to the same cache line, wherein the boundary indication value for the data value is determined by accessing memory storing an association between the data type and the boundary indication value; and
a command execution module coupled with the metadata management logic and configured to, for each data value in a set of one or more data values:
store the low order portion at a first memory location in the memory system utilizing a low data fidelity storage scheme, and
store the high order portion at a second memory location in the memory system utilizing a high data fidelity storage scheme for recording data at a higher data fidelity than the low data fidelity storage scheme.

11. The memory controller of claim 10, wherein for each data value in the set of data values:
the boundary indication value for the data value is associated with a data type stored in a tag associated with the data value, and
the tag is stored adjacent to at least one of the high order portion of the data value and the low order portion of the data value.

12. The memory controller of claim 10, wherein the metadata management logic is further configured to, for each data value in the set of data values, read the tag for the data value in response to a directive in a program being executed, and wherein the data value represents an operand of an instruction in the program.

13. The memory controller of claim 10, wherein the metadata management logic is further configured to, for each data value in the set of data values, locate the tag for the data value based on a memory address received at the command interface for the data value.

14. The method of claim 10, wherein the low data fidelity storage scheme records data at a higher areal density than the high data fidelity storage scheme.

15. The memory controller of claim 10, wherein the command execution module is further configured to, for a first data value in the set of data values:
store the low order portion of the first data value in a first memory cell, and
store the high order portion of the first data value in a second memory cell, wherein the first memory cell is a multi-level memory cell having more levels per cell than the second memory cell.

16. A computing system, comprising:
a host device;
a memory system coupled with the host device; and
a memory controller coupled with the memory system, wherein the memory controller is configured to:
for each of a plurality of data types, record an association between the data type and one of a plurality of boundary indication values;
for each data value in a set of one or more data values, in response to a memory request for the data value, accessing a tag indicating a data type of the data value, and
determining a boundary indication value of the plurality of boundary indication values that indicates a boundary between a high order portion of the data value and a low order portion of the data value, wherein the boundary indication value for the data value is determined by accessing memory storing an association between the data type and the boundary indication value;
copy the tag associated with the data value to a cache line contemporaneously with copying the data value to the same cache line, wherein the tag identifies the boundary indication value for the data value;
store the low order portion at a first memory location in the memory system utilizing a low data fidelity storage scheme; and
store the high order portion at a second memory location in the memory system utilizing a high data fidelity storage scheme for recording data at a higher data fidelity than the low data fidelity storage scheme.

17. The computing system of claim 16, further comprising a compression engine coupled with the memory controller, wherein for each data value in the set of data values, the compression engine is configured to:
compress the low order portion of the data value using a lossy compression scheme;
compress the high order portion of the data value using a lossless compression scheme; and
decompress the low order portion and the high order portion when transferring the data value to a cache memory.

18. The computing system of claim 16, wherein:
the memory system further comprises a cache; and
wherein for each data value in the set of data values,
the memory controller is further configured to copy the data value and a tag for the data value to the cache line in the cache, and the cache is configured to utilize a third storage scheme for storing the data value that records the data value at a higher data fidelity that the low data fidelity storage scheme.

19. The computing system of claim 16, wherein:

the memory system is further configured to, for each data value in the set of data values, associate a data type of the data value with a memory address of the data value, and the memory controller is further configured to, for each data value in the set of data values and in response to receiving the memory address for the data value, determine the boundary indication value for the data value by identifying the data type of the data value based on the received memory address.

20. The computing system of claim 16, further comprising a compiler coupled with the host device, wherein the compiler is configured to:

compile a program, wherein each data value in the set of data values represents an operand of one or more instructions in the program; and for each data value in the set of data values, generate a tag containing a data type of the data value.

* * * * *